US012270369B2

(12) United States Patent
De Raeve et al.

(10) Patent No.: US 12,270,369 B2
(45) Date of Patent: Apr. 8, 2025

(54) ENERGY STORAGE SYSTEM

(71) Applicant: Sulzer Management AG, Winterthur (CH)

(72) Inventors: Karel De Raeve, Winterthur (CH); Thomas Welschinger, Radolfzell (DE); Lorenz Schneider, Schaffhausen (CH)

(73) Assignee: Sulzer Management AG, Winterthur (CH)

( * ) Notice: Subject to any disclaimer, the term of this patent is extended or adjusted under 35 U.S.C. 154(b) by 22 days.

(21) Appl. No.: 18/199,098

(22) Filed: May 18, 2023

(65) Prior Publication Data

US 2023/0383718 A1 Nov. 30, 2023

(30) Foreign Application Priority Data

May 31, 2022 (EP) .................................... 22176562

(51) Int. Cl.
*F03B 13/10* (2006.01)
*F03B 13/06* (2006.01)
*F03B 15/04* (2006.01)

(52) U.S. Cl.
CPC .............. *F03B 13/10* (2013.01); *F03B 13/06* (2013.01); *F03B 15/04* (2013.01); *F05B 2240/97* (2013.01)

(58) Field of Classification Search
CPC .......... F03B 13/10; F03B 13/06; F03B 15/04; F03B 3/103; F03B 11/004; F05B 2240/97; F05B 2260/422
See application file for complete search history.

(56) References Cited

U.S. PATENT DOCUMENTS 6,441,508 B1 * 8/2002 Hylton .................. F03B 13/105 415/81
8,413,442 B2 * 4/2013 Tarabishi ................ F03G 6/065 126/607

(Continued)

FOREIGN PATENT DOCUMENTS

CN 105927455 A 9/2016
DE 102016009990 A1 2/2018

(Continued)

OTHER PUBLICATIONS

WO-2022107069-A1 (Year: 2022).*

(Continued)

*Primary Examiner* — Pedro J Cuevas
(74) *Attorney, Agent, or Firm* — Global IP Counselors, LLP

(57) ABSTRACT

An energy storage system includes a vessel, an energy conversion device, and a connection line connecting the vessel with the energy conversion device. The energy conversion device includes a housing, a pump turbine, and a motor generator. The pump turbine includes a first shaft, and an impeller. The motor generator includes a second shaft, and a rotor. The second shaft is coupled to the first shaft to transmit torque between the first shaft and the second shaft. The connection line connects a low pressure opening with an opening disposed at the vessel to receive water from the vessel or discharge water into the vessel. The connection line includes a switching unit with a shut-off device and a non-return device connected in parallel, the non-return device enabling flow of the water only in a first direction from the vessel to the low pressure opening.

16 Claims, 3 Drawing Sheets

(56) References Cited

U.S. PATENT DOCUMENTS 9,494,127 B2 * 11/2016 Hongawa ................ F03B 13/06
9,841,026 B2 * 12/2017 Stinessen .............. F04D 25/026
9,951,979 B2 * 4/2018 Aga .......................... F01K 3/18
9,995,285 B2 * 6/2018 Ehrsam ................... F03G 6/067
10,049,776 B2 * 8/2018 Wattenburg ............. F01D 15/10
11,118,575 B2 * 9/2021 Karni ...................... F24S 60/10
11,415,169 B2 * 8/2022 De Raeve ............... F16C 27/02
11,846,297 B2 * 12/2023 De Raeve ............. F04D 13/086
11,959,451 B2 * 4/2024 Kim .......................... F03B 3/04
11,988,213 B2 * 5/2024 De Raeve ............... F04D 17/12
12,006,946 B2 * 6/2024 De Raeve ................. F04D 1/06
12,044,200 B2 * 7/2024 Aufiero ................... F03B 13/10
2002/0070560 A1 * 6/2002 Hylton .................... F03B 15/04 290/52
2007/0200438 A1 * 8/2007 Kaminski ............. F04D 17/122 310/59
2010/0253080 A1 * 10/2010 DeAngeles ........... F03B 17/005 290/52
2012/0042652 A1 * 2/2012 Tarabishi ................ F03G 6/065 126/576
2013/0192216 A1 * 8/2013 Berlin, Jr. ................. F02C 6/16 60/413
2014/0319840 A1 * 10/2014 Lu ........................... F03B 13/06 290/54
2015/0176559 A1 * 6/2015 Hongawa ................ F03B 15/14 60/398
2015/0240792 A1 * 8/2015 Ehrsam ................... F22B 1/006 60/641.8
2016/0222830 A1 * 8/2016 Aga ........................ F01K 23/04
2016/0333677 A1 * 11/2016 Westberg .............. F04D 13/025
2017/0186503 A1 * 6/2017 Wattenburg .............. G21D 1/02
2017/0284378 A1 * 10/2017 Ehrsam ...................... F22D 1/00
2017/0287576 A2 * 10/2017 Wattenburg .............. G21D 1/02
2020/0095984 A1 * 3/2020 Karni ...................... F03G 6/064
2020/0340480 A1 * 10/2020 Felix ....................... F04D 13/08
2021/0033095 A1 * 2/2021 De Raeve ............... F04D 25/16
2021/0123476 A1 * 4/2021 De Raeve ........... F16F 15/0237
2021/0324868 A1 * 10/2021 De Raeve ........... F04D 29/0413
2022/0074381 A1 * 3/2022 Kim .......................... F03B 3/04
2022/0178381 A1 * 6/2022 De Raeve ................. F04D 1/06
2022/0213860 A1 * 7/2022 Kim .......................... F03B 3/04
2023/0193932 A1 * 6/2023 De Raeve ............... F03B 13/06 290/54
2023/0323885 A1 * 10/2023 De Raeve ........... F04D 29/0516 417/423.1
2023/0383718 A1 * 11/2023 De Raeve ............... F03B 13/06
2023/0407833 A1 * 12/2023 Aufiero ................... F03B 13/06

FOREIGN PATENT DOCUMENTS

EP 2345809 A1 7/2011
EP 3686436 A1 * 7/2020 ......... E21B 41/0007
EP 3913227 A1 * 11/2021 ............... F04D 1/06
EP 4006347 A1 * 6/2022 ............... F04D 1/06
EP 4027020 A1 * 7/2022 ............... F04D 1/06
JP 3294662 A 12/1991

OTHER PUBLICATIONS

Machine translation of DE 10 2016 009 990 A1 (Year: 2016).*
European Search Report issued Nov. 22, 2022 in corresponding European Application No. 22176562.1.

* cited by examiner

ENERGY STORAGE SYSTEM

CROSS-REFERENCE TO RELATED APPLICATION

This application claims priority to European Patent Application 22176562.1, filed May 31, 2022, the contents of which are hereby incorporated by reference in its entirety.

BACKGROUND

Technical Field

The disclosure relates to an energy storage system and to a method of operating an energy storage system.

Background Information

One of the biggest challenges regarding power or energy generation from renewable sources such as wind or solar energy is the intermittency, because wind and solar energy are sometimes not available in a sufficient amount to generate the required electric power. In other times the amount of wind and solar energy is much larger than the required electric power. To better match the renewable energy production profile with the energy demand profile, energy storage is needed to flatten the peaks and the valleys of the intermittent renewable energy production to better match the energy demand.

For offshore wind energy production this is even more important since the capacity of the power transmission lines between the offshore wind park and the onshore grid are limited. Energy storage would allow to store the peak energy production of the wind park, which is above the maximum power transmission capacity. For technical and economic reasons, the power transmission capacity of an offshore wind park is usually smaller than the peak power production capacity. This is also known as overplanting. As a result, it might be required to shut down some of the wind turbines during periods of very strong wind. Of course, this is not satisfactory.

SUMMARY

It has been determined that if an economic offshore energy storage system were available, the produced energy, e.g. during times of peak production could be stored at the offshore location. This would also enable a further reduction in the capacity of the power transmission system for transporting the power from the offshore location to an onshore grid. Thus, the power transmission capacity could be matched much better to an average power production of the wind park which is a big advantage in view of an economical layout and an economical operation of the wind park and the power transmission system.

The energy storage system would enable a much better reaction to the changes in demand for energy. Furthermore, the energy could be stored when electricity prices are low and could be released when electricity prices are high. This enables a considerably better match between supply and demand, which results in a reduction of gas power plant usage that are normally used as peaking power plants to cover the gap between demand and supply.

A highly efficient and well established onshore energy storage system is a pumped storage hydroelectric power plant. The principle includes pumping water from a lower water reservoir to a higher reservoir, when excess energy is available. When there is a higher demand for electricity the water is allowed to flow from the higher reservoir through turbines to the lower reservoir, and the turbines drive generators to produce electric energy. Thus, the pumped storage plant transforms electric energy in potential energy by pumping the water to the higher reservoir and transforms potential energy in electric energy when the water drives the turbines upon flowing from the higher reservoir to the lower reservoir.

It has been proposed to use the same principle, i.e. selectively converting between potential energy and electric energy, at an underwater location, for example at a subsea location on the sea ground or in a deep lake. Such an energy storage system is for example disclosed in US 2015/361948 A1.

A large vessel, for example a hollow concrete sphere, is positioned on the seabed. Optionally, but not necessarily the inside of the vessel is openly connected to the atmosphere above the sea surface. The vessel corresponds to the lower reservoir and the surrounding seawater pressure corresponds to the higher reservoir.

When the vessel is filled with water, a pump empties the vessel by discharging the water from the vessel against the hydrostatic pressure of the water prevailing at the underwater location of the pump. Thus, electric energy is converted to potential energy. This corresponds to pumping the water from the lower reservoir to the higher reservoir in a usual pumped storage plant.

To regain the electric energy the water surrounding the vessel is allowed to fill the vessel by passing through a turbine, which drives a generator. Thus, the potential energy of the surrounding water is converted in electric energy. This corresponds to allowing the water to flow from the higher reservoir to the lower reservoir through a turbine in a usual pumped storage reservoir.

In order to minimize the equipment at the underwater location it is advantageous to use an energy conversion device that can be operated in both directions. The energy conversion device comprises a pump turbine unit which is coupled with a motor generator unit. For emptying the vessel the pump turbine unit is operated in a pump mode and driven by the motor generator unit operated in a motor mode. For filling the vessel, the flow direction through the pump turbine unit is reversed. The pump turbine unit is operated in a turbine mode and drives the motor generator unit which is then operated in a generator mode to produce electric energy.

Usually, a plurality of vessels, e.g. spheres or cylindrical vessels are provided at the underwater location to increase the capacity of the energy storage system. A single energy conversion device can be used to selectively fill and discharge a plurality of vessels.

It goes without saying that each vessel has to be strong enough to withstand the hydrostatic pressure of the water at the underwater location, even if the vessel is empty. Therefore, concrete is a preferred material to manufacture the vessels.

The capacity of the energy storage system, which is crucial for its economic viability, depends on the number of vessels, the volume of the vessels that can be filled with water as well as the depth of the underwater location where the vessels are located. In case the vessel is shaped as a sphere, the inner diameter should be at least 30 m for but can be 100 m or even more. The depths of the underwater location. e.g. at the sea ground, should preferably be at least a few hundred meters for an economically reasonable operation of the energy storage system. Since the distance of the underwater location from the water surface determines the hydrostatic pressure at the underwater location it is desirable to install the energy recovery system even deeper, for example at least 1000 m or at least 2000 m below the water surface.

Therefore pump turbine units and motor generator units are required, which are able to reliably operate in such a depth under the water surface. The design of such pumps, turbines, motors or generators is challenging, in particular because the equipment shall operate in a difficult subsea environment for a long time period with as little as possible maintenance and service work. This requires specific measures to minimize the amount of equipment involved and to optimize the reliability of the equipment.

Subsea pumps which can be operated on the sea ground in a depth of 2000 m or even more are known from the oil and gas industry. In view of an efficient exploitation of oil and gas fields, there is nowadays an increasing tendency to install pumps and in particular water injection pumps directly on the sea ground in particular down to a depth of 1000 m or even down to more than 2000 m beneath the water surface. For driving such subsea pumps it is known to use liquid filled or flooded induction motors or permanent magnet motors. The motor can be filled with a barrier liquid, which prevents the process fluid from entering the motor. It goes without saying that for subsea installations on the sea ground the reliability of a pump and the minimization of wear and degradation within the pump are of utmost importance.

An energy storage system configured for installation at an underwater location and comprising a pump turbine unit as well as a motor generator unit is for example disclosed in the European patent application no. 21216018.8.

Another important criterion for the economic operation of an energy storage system is the efficiency of the energy conversion meaning that the energy losses for the conversions between potential energy and electric energy should be reduced as much as possible. The overall cycle efficiency or the recovery efficiency for the energy should be maximized.

In known energy storage systems comprising a pump turbine unit a problem exists regarding the staring of the pump mode, i.e. the beginning of the emptying of the vessel against the hydrostatic pressure of the water prevailing at the underwater location. Usually, the pump mode is started from a standstill of the pump turbine unit, i.e. the pump turbine unit is at standstill prior to the starting of the pump mode. The connection line between the pump turbine unit and the vessel filled with water is closed. The pressure above the water in the vessel is typically close to atmospheric pressure, e.g. because the inside of the vessel is openly connected to the atmosphere above the water surface. The pressure available at the suction side of the pump turbine unit varies within several bar (1 bar equals 0.1 MPa) above the atmospheric pressure in function of the height of the water level in the vessel. At the discharge of the pump turbine unit the hydrostatic pressure of the water prevails. At a water depth of, for example, 1000 m below the water surface, the hydrostatic pressure is approximately 100 bar (10 MPa). Thus, the pressure difference between the pressure generated by the water in the vessel and the hydrostatic pressure at the underwater location is roughly 100 bar. This means that the pump turbine unit has to be started with a pressure difference of roughly 100 bar between its suction side and its pressure side. If opening the connection line between the vessel and the pump turbine unit at the same time as starting the pump turbine unit for starting the pump mode, there is a back flow or a reverse flow through the pump turbine unit as long as the pump turbine unit has not yet reached almost its full rotational speed. This means that at the beginning of the pump mode the pump turbine unit operates in an energy dissipating mode, because the rotation starts against the reverse flow. The dissipation of energy is detrimental to the efficiency of the energy conversion system. Furthermore, the energy dissipating mode is typically characterized by high torques and high hydraulic excitations, which will result in significant vibrations. This is particular critical during start-up conditions, because at low rotational speeds the fluid film e.g. in hydrodynamic bearings has not yet properly established. Thus, having high vibrations at lower speeds during start-up could result in bearing failure.

The disclosure addresses this problem.

It is therefore an object of the disclosure to propose an energy storage system configured for installation at an underwater location, e.g. a subsea location at the sea ground, having a high cycle efficiency regarding the energy conversion from potential energy into electric energy and vice versa. In particular, the energy storage system should allow for an energy efficient and material-friendly starting of the pump mode for emptying the vessel. In addition, it is an object of the disclosure to propose a method of operating an energy storage system configured for installation at an underwater location in an energy efficient and material-friendly manner.

The subject matter of the disclosure satisfying these objects is characterized by the features of the embodiments described herein.

Thus, according to the disclosure, an energy storage system is configured for installation at an underwater location is proposed, comprising a vessel for storing water at a low pressure, an energy conversion device for selectively converting between potential energy and electric energy, and a connection line connecting the vessel with the energy conversion device,

- wherein the energy conversion device comprises a housing, a pump turbine unit arranged in the housing, and a motor generator unit,
- wherein the housing comprises a low pressure opening for receiving water at the low pressure, and a high pressure opening for discharging water at a high pressure,
- wherein the pump turbine unit comprises a first shaft for rotating about an axial direction, and at least one impeller mounted on the first shaft for interacting with the water,
- wherein the motor generator unit comprises a second shaft for rotating about the axial direction, and a rotor provided at the second shaft for rotating relative to a stator,
- wherein the second shaft is coupled to the first shaft for transmitting a torque between the first shaft and the second shaft, and
- wherein the connection line is configured to connect the low pressure opening with an opening provided at the vessel for receiving water from the vessel or discharging water into the vessel.

The connection line comprises a switching unit with a shut-off device and a non-return device connected in parallel, wherein the non-return device is configured to allow a flow of the water only in a first direction, namely from the vessel to the low pressure opening.

The combination of a shut-off device and the non-return device, which are arranged in parallel, renders possible to start the pump mode for emptying the vessel without operating the pump turbine unit in an energy dissipating mode, in which the rotation of the impeller(s) has to be started against a reverse flow through the pump turbine unit. For staring the pump mode the pump turbine unit is operated with a zero flow until the rotational speed of the impeller(s) is sufficient to generate a positive flow from the low pressure opening to the high pressure opening. Therewith, also the considerable vibrations occurring in the energy dissipating mode are avoided, so that a material-friendly starting of the pump mode becomes possible.

Prior to starting the pump mode, the pump turbine unit is at standstill. At the high pressure opening the hydrostatic pressure of the water at the underwater location prevails. The shut-off device is in the closed position, so that the water cannot pass from the vessel through the shut-off device to the low pressure opening. The non-return device allows a flow of water only in the first direction, which is the direction towards the low pressure opening. The non-return device blocks a flow of water from the low pressure opening towards the vessel. As long as the pump turbine unit is at standstill there is no flow. When the pump turbine unit is started for operating in the pump mode, the first shaft with the impeller(s) starts to rotate, wherein the rotation is driven by the second shaft of the motor generator unit operating in the motor mode.

As long as the first shaft with the impeller(s) is at low rotational speeds, the pump turbine unit is operated at zero flow. The shut-off device is in the closed position, and there is no sufficient pressure drop across the non-return device to overcome the opening pressure of the non-return device. Since the pressure prevailing at the low pressure opening downstream of the non-return device is larger than the pressure upstream of the non-return device, which is the hydrostatic pressure of the water in the vessel, there is no flow through the non-return device. The non-return device will only allow a flow of the water towards the low pressure opening once the pump turbine unite generates enough pressure rise, so that the pressure prevailing at the low pressure opening downstream of the non-return valve becomes smaller than the pressure upstream of the non-return device. Of course, the non-return device requires a certain opening pressure for opening, so that the flow in the first direction starts. This opening pressure is preferably adjusted to be as small as possible, so that the flow through the non-return device will start as soon—at least approximately—as the pressure at the downstream side of the non-return device becomes smaller than the pressure at the upstream side of the non-return device. When the pump turbine unit is at its operating rotational speed (duty point speed), or at least close to its operating rotational speed, the pump turbine unit generates sufficient pressure rise to discharge the water through the high pressure opening against the hydrostatic pressure prevailing at the high pressure opening. Then the non-return device will automatically open, because the pressure at the low pressure opening falls below the value of the hydrostatic pressure caused by the water in the vessel at the upstream side of the non-return device.

Now, the pump mode is fully operating and the water is discharged from the vessel through the high pressure opening. Once the pump turbine unit is at its operating rotational speed and the non-return device has opened, it is possible to additionally switch the shut-off device in the open position, in which the shut-off device allows a flow of water passing through the shut-off device. Opening the shut-off device reduces the overall flow resistance, which is advantageous in view of the energy efficiency.

The zero flow conditions, at which the pump turbine unit is operated at the starting of the pump mode, are stable conditions. For example, pumps and in particular multistage pumps are quite regularly tested at zero flow conditions, e.g. during Factory Acceptance Testing FAT (shut-off head tests). The zero flow conditions are also conditions characterized by low torques.

Usually, the pump turbine unit will heat-up during operation at zero flow conditions. However, this is not an issue, because known pumps, for example, can be operated at least 30 seconds to 40 seconds at zero flow conditions. A typical time to reach the operating rational speed, for example 1600 rpm, starting from stillstand, is for example less than 10 seconds.

Preferably, the low pressure opening is located at a greater depth than the opening provided at the vessel. Thus, during pump mode, the vessel can be completely emptied and there is still a positive suction pressure at the low pressure opening, which is caused by the water in the connection line between the opening in the vessel and the low pressure opening.

Preferably, the shut-off device is configured as a control valve, allowing to regulate the flow between the closed position (no flow) and the open position (maximum flow). This renders possible to very smoothly start the turbine mode, in which the water enters the pump turbine unit through the high pressure opening, drives the rotation of the first shaft for generating electric energy by the motor generator unit operating in the generator mode, and is discharged through the low pressure opening into the vessel. The turbine mode is started slowly by slowly opening the control valve from the closed position to the open position. Thus, the full pressure difference between the high pressure and the low pressure is gradually transferred from across the control valve to across the impeller(s) of the pump turbine unit.

According to a preferred configuration the energy conversion device is configured as a multistage pump comprising the housing, wherein the pump turbine unit and the motor generator unit are arranged within the housing, wherein the first shaft extends from a drive end to a non-drive end, and wherein the drive end is coupled to the second shaft. Thus, multistage pumps, which are known as such, for example subsea multistage pumps as they are used in the oil and gas industry and which are configured for a deployment at a sea ground can be used as the energy conversion device of the energy storage system.

Preferably, the pump turbine unit comprises a mechanical seal for sealing the pump turbine unit at the first shaft near to the drive end, with the mechanical seal having a process side facing the pump turbine unit, wherein the process side is in fluid communication with the high pressure opening, so that the pressure prevailing at the process side is at least approximately the same as the pressure at the high pressure opening. Since the pressure at the high pressure opening is given by the hydrostatic pressure of the water prevailing at the underwater location, the pressure prevailing at the process side of the mechanical seal is constant in time. Thus, it is very easy to maintain a stable pressure difference across the mechanical seal, which is beneficial for the longevity of the mechanical seal. In addition, when the mechanical seal is operated with a barrier fluid, the stable pressure difference results in a very low consumption of the barrier fluid.

In a preferred configuration the pump turbine unit comprises a balance drum, which is fixedly connected to the first shaft adjacent to the non-drive end, the balance drum defining a front side facing the pump turbine unit and a back side, wherein a relief passage is provided between the balance drum and a stationary part configured to be stationary with respect to the housing, the relief passage extending from the front side to the back side, and wherein a balance line is provided and configured for recirculating pressurized water to the back side. For example, the balance line can connect the process side of the mechanical seal with the back side. Since the pressure prevailing at the process side is at least approximately as large as the high pressure prevailing at the high pressure opening, the back side of the balance drum is also exposed to a pressure which is essentially the same as the high pressure. Since the pressure at the front side of the balance drum is lower than the high pressure, the balance drum generates a force acting on the first shaft in the axial direction. By the force the axial thrust generated by the impeller(s) during operation of the pump turbine unit in the pump mode is at least partially compensated. This measure considerably reduces the load that has to be carried by the axial or thrust bearing(s) supporting the first shaft.

Preferably, the front side is in fluid communication with the low pressure opening, so that the pressure prevailing at the front side is at least approximately the same as the pressure at the low pressure opening. In this configuration the pressure drop over the balance drum is approximately the same as the difference between the high pressure and the low pressure. This large pressure drop is advantageous for counteracting the axial thrust generated by the impeller(s).

Regarding the support of the first shaft it is preferred, that the first shaft is radially supported in a non-contacting manner during operation, wherein the pump turbine unit comprises exactly one hydrodynamic radial bearing for supporting the first shaft, and wherein the radial bearing is arranged at the drive end of the first shaft. In particular in embodiments having the balance drum at the non-drive end of the first shaft, it is not necessary to provide a separate hydrodynamic radial bearing at the non-drive end of the first shaft, because the balance drum, more precisely, the water flowing through the relief passage along the balance drum, generates radial support forces. These radial support forces are caused by the Lomakin effect and they center the balance drum relative to the stationary part surrounding the balance drum. Thus, the Lomakin effect provides for a radial support of the first shaft at its non-drive end, so that there is no need for another radial bearing.

Radial bearings, which are also designated as journal bearings, are complex, highly expensive components for supporting the first shaft. A radial bearing is one of the components which impact the mean time between maintenance. Thus, reducing the number of radial bearings for the first shaft, reduces the complexity of the pump turbine unit as well as the likelihood of a failure of the pump turbine unit. Furthermore, the reduced number of radial bearings considerably reduces the costs of the pump turbine unit. By reducing the number of radial bearings, the first shaft as well as the housing reduce in length, which reduces the weight of the unit. This has an impact on material cost as well as installation costs.

Of course, in other embodiments it is also possible to provide a further radial bearing, for example an additional hydrodynamic radial bearing, at the non-drive end of the first shaft for radially supporting the first shaft.

Furthermore, in embodiments having the balance drum at the non-drive end of the first shaft, it is preferred that the mechanical seal arranged near to the drive end is the sole mechanical seal for sealing the pump turbine unit at the first shaft. Thus, it is preferred that there is no mechanical seal at the non-drive end of the first shaft. Mechanical seals are complex, very expensive components for sealing the first shaft. Thus, reducing the number of mechanical seals for the first shaft, reduces the complexity of the pump turbine unit as well as the likelihood of a failure of the pump turbine unit. Furthermore, the reduced number of mechanical seals considerably reduces the costs of the pump turbine unit. By reducing the number of mechanical seals, the first shaft as well as the housing reduce in length, which reduces the weight of the pump turbine unit. This has an impact on material cost as well as installation costs.

Of course, in other embodiments it is also possible to provide a further mechanical seal at the non-drive end of the first shaft.

In a preferred configuration the pump turbine unit comprises a first stage impeller, a last stage impeller, and optionally at least one intermediate stage impeller, wherein the first stage impeller is configured as a double suction impeller. Preferably, only the first stage impeller is configured as a double suction impeller, and each of the optional intermediate stage impeller(s) as well as the last stage impeller are configured as single suction impellers. Configuring the first stage impeller as a double suction impeller has the advantage that the required NPSH (net positive suction head) for the first stage is considerably lower as compared to a single suction design of the first stage impeller. Therewith, the risk of cavitation is strongly reduced.

Furthermore, regarding embodiments in which the energy conversion device is configured as a multistage pump with the pump turbine unit and the motor generator unit arranged within the housing, it is preferred that the multistage pump is configured as a vertical pump with the first shaft extending in the direction of gravity, wherein the motor generator unit is arranged on top of the pump turbine unit.

Preferably, the motor generator unit is configured as a liquid filled motor generator unit, wherein a barrier fluid can be supplied to the motor generator unit at a pressure, which is at least as high as the pressure prevailing at the process side of the mechanical seal. The barrier fluid shall prevent the water from entering the motor generator unit. Even more preferred the barrier fluid is supplied to the motor generator unit at a pressure, which is slightly larger than the high pressure at the process side of the mechanical seal to ensure that any leakage across the mechanical seal is always directed from the motor generator unit to the process side and not the other way around.

Furthermore, according to the disclosure, a method of operating an energy storage system configured for installation at an underwater location, is proposed. The method comprises the steps of:

- providing an energy storage system comprising a vessel for storing water at a low pressure, an energy conversion device for selectively converting between potential energy and electric energy, and a connection line connecting the vessel with the energy conversion device, wherein the energy conversion device comprises a housing, a pump turbine unit arranged in the housing, and a motor generator unit, wherein the housing comprises a low pressure opening for receiving water at the low pressure, and a high pressure opening for discharging water at a high pressure, wherein the pump turbine unit comprises a first shaft for rotating about an axial direction, wherein the motor generator unit comprises a second shaft for rotating about the axial direction, and wherein the second shaft is coupled to the first shaft for transmitting a torque between the first shaft and the second shaft, and
- selectively operating the energy storage system in a pump mode or in a turbine mode, wherein in the pump mode the pump turbine unit is operated to discharge the water from the vessel through the high pressure opening, wherein in the turbine mode the water enters the housing through the high pressure opening, drives the rotation of the first shaft and is discharged through the low pressure opening to the vessel.

The method is characterized in that the pump mode is started with operating the pump turbine unit with a zero flow until the rotational speed of the first shaft is sufficient to generate a positive flow from the low pressure opening to the high pressure opening.

In an analogous manner as it has been explained with respect to the energy storage system according to the disclosure, the method according to the disclosure renders possible to start the pump mode for emptying the vessel without operating the pump turbine unit in an energy dissipating mode, in which the rotation of the impeller(s) has to be started against a reverse flow through the pump turbine unit. For staring the pump mode the pump turbine unit is operated with a zero flow until the rotational speed of the impeller(s) is sufficient to generate a positive flow from the from the low pressure opening to the high pressure opening. Therewith, also the considerable vibrations occurring in the energy dissipating mode are avoided, so that a material-friendly starting of the pump mode becomes possible.

Preferably, a check valve is used to end the operating of the pump turbine unit with the zero flow. As it has been explained before, once the check valve has opened, the pump turbine unit generates a positive flow from the low pressure opening to the high pressure opening, i.e. the zero flow conditions are terminated.

It is another preferred measure that the turbine mode is started by opening a control valve provided in the connection line. The control valve renders possible a smooth starting of the turbine mode.

Further advantageous measures and embodiments of the disclosure will become apparent from the disclosure.

BRIEF DESCRIPTION OF THE DRAWINGS

Aspects of the invention will be explained in more detail hereinafter with reference to embodiments and with reference to the drawings.

DETAILED DESCRIPTION

Figure 1:
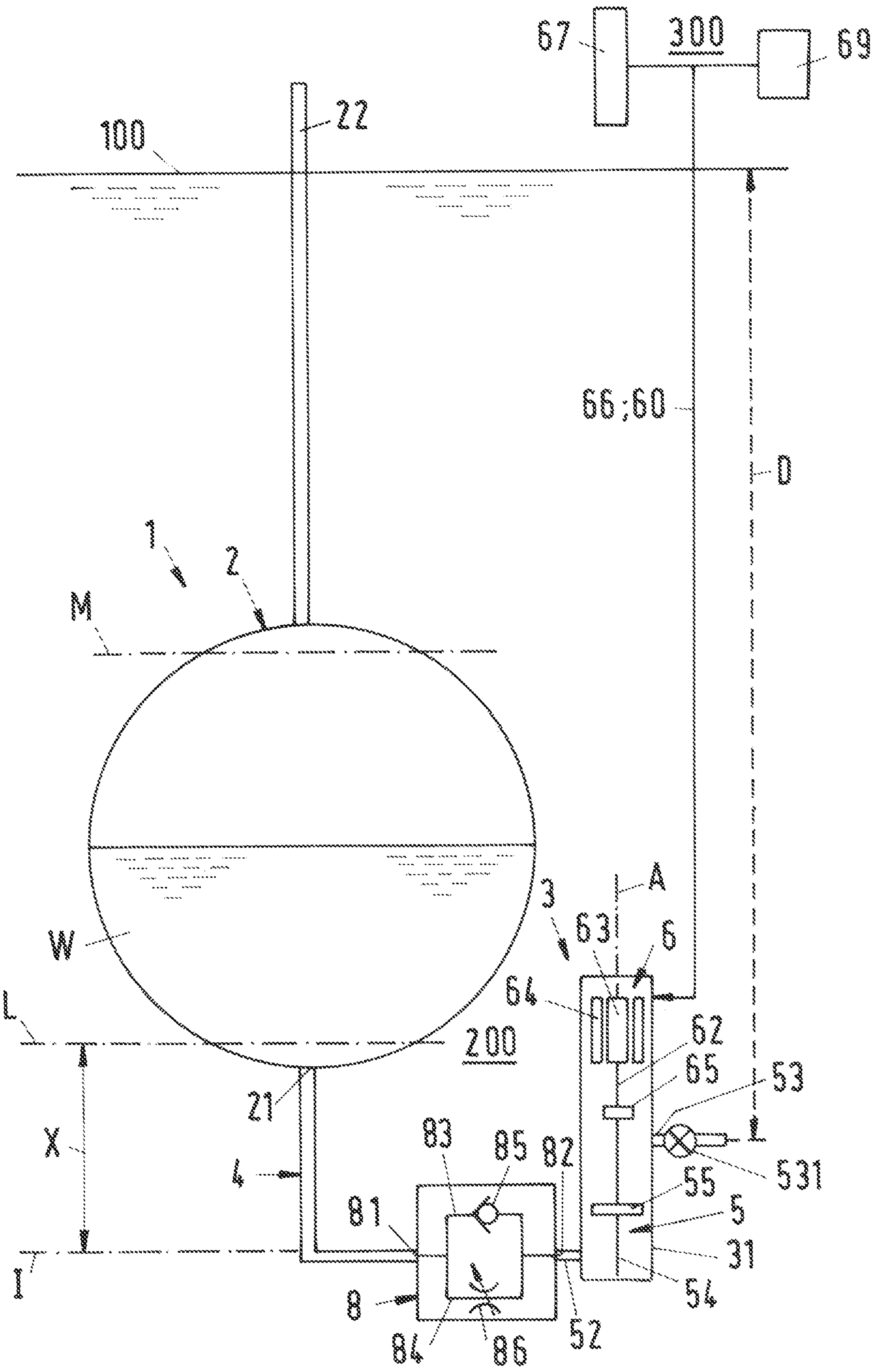
FIG. 1 is a schematic representation of an embodiment of an energy storage system according to the disclosure.

FIG. 1 shows a schematic representation of an embodiment of an energy storage system according to the disclosure. The energy storage system is designated in its entity with reference numeral 1 and is configured for an installation at an underwater location 200 below a water surface 100. The underwater location 200 can be for example a subsea location on the sea ground or a location at the ground of a deep lake. In the following description the term "depth" designates the vertical distance from the water surface 100. The underwater location 200 is preferably at a depth of at least 400 m. The underwater location 200 can be at a considerably greater depth, for example at a depth of at least 1000 m or at least 2000 m.

In the following description the terms "high", "higher", "low", "lower" and the like refer to the respective depth. With respect to a location, for example the location of a component, the term "lower" means "at a greater depth" and the term "higher" means "at a smaller depth". Thus, the relative designations "higher" and "lower" refer to the vertical distance from the water surface 100. A higher location is closer to the water surface 100 or higher as measured from the bottom of the lake or the sea or the water body than a lower location.

The energy storage system 1 comprises a vessel 2 arranged at the underwater location 200. The vessel 2 for storing water W is secured for example to the sea ground. The vessel 2 is configured to withstand the pressure prevailing at the underwater location 200. The vessel 2 is for example made of concrete and can be configured as a hollow sphere or as a hollow cylinder for receiving water W. If the vessel 2 is configured as a hollow sphere, its inner diameter is preferably at least 30 m, but can also be considerably larger, for example 100m or even more. The vessel 2 can also be configured as a cylindrical pipe or in another cylindrical shape. Particularly preferred, the vessel 2 has a volume of at least 100,000 $m^3$. The energy storage system 1 can also comprise a plurality of vessels 2 arranged at the underwater location 200. It goes without saying that each vessel 2 is configured to withstand the hydrostatic pressure of the water prevailing at the underwater location 200. Since it is sufficient for the understanding of the disclosure, in the following description reference is made to only one vessel 2. However, as already the, the energy storage system 1 can also comprise a plurality of vessels 2.

The energy storage system 1 further comprises an energy conversion device 3 which is also arranged at the underwater location 200 in the proximity of the vessel 2 or at the vessel 2. A connection line 4 connects the vessel 2 with the energy conversion device 3, The energy conversion device 3 is configured for selectively converting potential energy in electric energy or electric energy in potential energy. The energy conversion device 3 comprises a pump turbine unit 5, a motor generator unit 6 and a housing 31, wherein the pump turbine unit 5 is arranged in the housing 31. It is possible to provide a separate housing for the motor generator unit, however it is preferred, as shown in FIG. 1, that the housing 31 is configured as a common housing 31, in which both the pump turbine unit 5 and the motor turbine unit 6 are arranged. The housing 31 is configured to withstand the pressure prevailing at the underwater location 200 as well as the pressure generated by the pump turbine unit 5.

The pump turbine unit 5 is operable in a pump mode for pumping water W out of the vessel 2 and in a turbine mode for being driven by the water W discharged into the vessel 2 from the environment at the underwater location 200. The motor generator unit 6 is operable in a motor mode for driving the pump turbine unit 5, when the pump turbine unit 5 is operated in the pump mode. Furthermore, the motor generator unit 6 is operable in a generator mode for generating electric energy, when the pump turbine unit 5 operates in the turbine mode and drives the motor generator unit 6.

The housing 31 has a low pressure opening 52 and a high pressure opening 53 for the water W, a first shaft 54 for rotating about an axial direction A, and at least one impeller 55, preferably a plurality of impellers 55, mounted on the first shaft 54 for interacting with the water. The axial direction A is defined by the longitudinal axis of the first shaft 54. The high pressure opening 53 is located at a depth D. Thus, the hydrostatic pressure of the water at the depth D is essentially the discharge pressure prevailing at the high pressure opening 53, against which the pump turbine unit 5 has to pump the water W out of the vessel 2 in the pump mode.

The pressure prevailing at the low pressure opening is referred to as "low pressure" and the pressure prevailing at the high pressure opening 53 is referred to as "high pressure". The low pressure constitutes the suction pressure for the pump turbine unit 5, when operating in the pump mode. The low pressure is given by the water level of the water W in the vessel 2. In addition, the vertical distance between the lower end of the vessel 2 and the low pressure opening 52 contributes to the suction pressure. When, for example, the vessel 2 is a sphere with an inner diameter of 30 m, the maximum value of the low pressure is approximately three bar (when the vessel 2 is completely filled) plus the hydrostatic pressure of the water in the connection line 4 above the low pressure opening 52.

Optionally, the high pressure opening 53 can be provided with a first shut-off valve 531 for opening and closing the flow passage through the high pressure opening 53. When the first shut-off valve 531 is in the open position, the high pressure opening 53 is open and the water can pass through the high pressure opening 53. When the first shut-off valve 531 is In the closed position, the high pressure opening 53 is closed and the water cannot pass through the high pressure opening 53, i.e. the water can neither flow into the housing 31 nor can the water leave the housing 31 through the high pressure opening 53. Optionally, a further shut-off valve (not shown) can be provided at the low pressure opening 52 for opening and closing the flow passage through the low pressure opening 52. The further shut-off valve at the low pressure opening 52 can be provided in addition to or instead of the first shut-off valve 531.

In the pump mode the first shaft 54 is driven by the motor generator unit 6 and the impeller(s) 55 covey(s) the water W from the vessel 2 through the low pressure opening 52 to the high pressure opening 53, where the water W is discharged to the environment. In the turbine mode the water enters the housing 31 from the environment through the high pressure opening 53, drives the impeller(s) 55 and is discharged through the low pressure opening 52 into the vessel 2.

The motor generator unit 6 arranged in the housing 31 comprises a second shaft 62 for rotating about the axial direction A and a rotor 63 fixed to the second shaft 62 for rotating relative to a stator 64, which is arranged stationary with respect to the housing 31. The second shaft 62 is coupled to the first shaft 54 by a coupling 65 for transmitting a torque between the first shaft 54 and the second shaft 62. An electric power line 66 is provided, which connects the motor generator unit 6 with an energy unit 67 located at location 300 at or above the water surface 100 for example on a platform. The energy unit 67 can be connected to a grid. In the motor mode the motor generator unit 6 receives electric energy from the energy unit 67 through the electric power line 66. The electric energy is used to rotate the rotor 63 and the second shaft 62 relative to the stator 64. The second shaft 62 drives the rotation of the first shaft 54, so that the pump turbine unit 5 is operated in the pump mode. In the generator mode the second shaft 62 is driven by the first shaft 54 and the rotation of the rotor 63 relative to the stator 64 generates electric energy which is delivered to the energy unit 67 by the electric power line 66.

The electric power line 66 can be integrated into an umbilical line 60 connecting the underwater location 200 with the location 300 at or above the water surface 100 for example on a platform. Beside the exchange of electric energy through the electric power line 66, the umbilical line 60 can be used to supply operating materials, e.g. a barrier fluid for the motor generator unit 6, from the location 300 to the underwater location 200, or to discharge material from the underwater location 200 to the location 300 at or above the water surface 100. As an example, FIG. 1 shows a barrier fluid reservoir 69 at the location 300, from where a barrier fluid for the motor generator unit 6 is supplied through the umbilical line 60 to the underwater location 200.

Preferably, the pump turbine unit 5 is configured as a vertical pump turbine unit 5, meaning that during operation the first shaft 54 is extending in the vertical direction, which is the direction of gravity. Thus, the axial direction A coincides with the vertical direction.

Furthermore, the energy storage system 1 comprises the connection line 4 that is configured to connect the low pressure opening 52 of the pump turbine unit 5 with an opening 21 provided at the vessel 2. The opening 21 is preferably arranged at the bottom of the vessel 2 or at a location of the vessel 2 being arranged at the greatest depth of the vessel 2. In the pump mode the connection line 4 receives water W from the vessel 2 by the pumping action of the pump turbine unit 5. In the turbine mode the water W leaves the housing 31 through the low pressure opening 52 and is discharged through the connection line 4 and the opening 21 into the vessel 2.

The connection line 4 includes a switching unit 8 for opening and closing the flow passage between the vessel 2 and the low pressure opening 52 through the connection line 4. The switching unit 8 is arranged in the connection line 4 and has a first fluid opening 81 as well as a second fluid opening 82 for receiving and discharging the water. The first fluid opening 81 is in fluid communication with the opening 21 of the vessel 2, and the second fluid opening 82 is in fluid communication with the low pressure opening 52 of the pump turbine unit 5. The first fluid opening 81 and the second fluid opening 82 are connected to each other by two branches, namely a first branch 83 and a second branch 84. The two branches 83, 84 are arranged in parallel.

The first branch 83 comprises a non-return device 85, for example a check valve or a non-return valve. The non-return device 85 is configured to allow a flow of the water only in a first direction, namely in the direction from the first opening 81 to the second opening 82. Thus, the water can flow through the first branch 83 only from the vessel 2 to the low pressure opening 52. The non-return device 85 blocks a flow of water through the first branch 83 in a second direction, which is opposite to the first direction, namely from the low pressure opening 52 towards the vessel 2. The non-return device 85 has an opening pressure which is very small. Preferably, the opening pressure of the non-return device 85 is as small as possible, so that the non-return device 85 opens as soon as the pressure prevailing at the first fluid opening 81 becomes larger than the pressure at the second fluid opening 82. As it is common in the art, the opening pressure of the non-return device 85 denotes the minimum pressure difference across the non-return device 85, which is required to open the non-return device 85 to allow a flow of the water in the first direction. This opening pressure is preferably as small as possible.

The second branch 84 comprises a shut-off device 86 for opening and closing the fluid passage through the second branch 84. The shut-off device 86 has a closed position, in which the shut-off device 86 closes the flow passage through the second branch 84, and an open position, in which the shut-off device 86 allows a flow of water passing through the second branch 84.

Preferably, the shut-off device 86 is configured as a control valve 86, allowing to regulate the flow between the closed position (no flow) and the open position (maximum flow). Preferably, the control valve 86 is configured for continuously adjusting the flow between the closed position and the open position.

In embodiments of the energy storage system 1 comprising more than one vessel 2 it is possible to provide a separate connection line 4 with a separate switching unit 8 for each vessel 2. Thus, the energy conversion device 3 can be selectively connected with each of the vessels 2. It is also possible to provide a common connection line 4 with a single switching unit 8 and to connect each of the vessels 2 to the common connection line 4. In this embodiment for each vessel 2 an additional shut-off valve is provided to selectively open or closed the flow connection between the respective vessel 2 and the common connection line 4.

Optionally, the vessel 2 comprises a vent 22 extending from the vessel 2 to a location at or above the water surface 100. By the vent 22 the pressure prevailing in the interior of the vessel 2 above the water W is essentially the same as the atmospheric pressure at the water surface 100, meaning that the water W in the vessel 2 is exposed to the ambient pressure prevailing at the water surface 100.

Furthermore, the vessel 2 can comprise a controller (not shown in detail) for ensuring that the water level in the vessel 2 will not exceed a maximum level M. The controller can comprise a sensor (not shown) for checking the fill level of the vessel. During turbine mode the vessel 2 is filled with water W. As soon as it is detected that the vessel 2 is filled to the maximum level M, the controller will prevent a further flow of water W into the vessel 2, e.g. by closing the flow passage through the switching unit 8.

In addition, the controller or an additional controller preferably ensures that the water level in the vessel 2 will not fall below a minimum level L. During pump mode the vessel 2 is emptied until the level of the water W in the vessel 2 reaches the minimum level L. As soon as it is detected that the water level has fallen to the minimum level L, the controller will prevent a further flow of water W out of the vessel 2, e.g. by switching-off the pump-turbine unit 5 or by closing the first shut-off valve 531.

Preferably, the low pressure opening 52 is located at a greater depth I than the opening 21. Thus, when the vessel 2 is emptied to the minimum level L during the pump mode, there is always a sufficiently large suction pressure prevailing at the low pressure opening 52. The minimum suction pressure at the low pressure opening 52 is given by the difference X between the minimum level L and the depth I, at which the low pressure opening 52 is located. Thus, the difference between the depth at which the minimum level is located and the depth I at which the low pressure opening 52 is located, determines the minimum suction pressure during the pump mode.

The operation of the energy storage system 1 will now be described. With exemplary character it is assumed that the vessel 2 is filled with water W up to the maximum level M. To "charge" the energy storage system, the motor generator unit 6 is operated in the motor mode and the pump turbine unit 5 is operated in the pump mode. The starting of the pump mode will be described in detail below. The motor generator unit 6 receives electric energy from the energy unit 67 through the electric power line 66 and drives the first shaft 54 with the impeller(s) 55. The hydrostatic pressure of the water W in the vessel 2 and the connecting line 4 generates the low pressure, i.e. the suction pressure prevailing at the low pressure opening 52. The hydrostatic pressure of the water at the underwater location 200 generates the high pressure, i.e. the discharge pressure prevailing at the high pressure opening 53. The pump turbine unit 5 conveys the water W from the low pressure opening 52 to the high pressure opening 53, where the water is discharged to the environment at the underwater location 200. As soon as the vessel 2 is emptied to the predefined minimum level L the pump mode is terminated for example by closing the fluid passage through the switching unit 8. The energy storage system 1 is "charged".

For recovering electric energy from potential energy the energy storage system 1 is "discharged". For this purpose the pump turbine unit 5 is operated in the turbine mode and the motor generator unit 6 is operated in the generator mode. For starting the turbine mode the fluid passage through the switching unit 8 is opened, for example by switching the shut-off device 86 to the open position. The hydrostatic pressure prevailing at the underwater location 200 at the depth D causes the water to flow through the high pressure opening 53 and to drive the impeller(s) 55 of the pump turbine unit 5. The water W is discharged through the low pressure opening 52 into the connecting line 4 and starts to fill the vessel 2. The first shaft 54 of the pump turbine unit 5 drives the second shaft 62 of the motor generator unit 6 and therewith causes the rotor 63 to rotate relative to the stator 64. By the rotation of the rotor 63 electric energy is generated, which is supplied through the electric power line 66 to the energy unit 67. The energy unit 67 can, for example, feed the electric energy to a grid or to a transmission line. As soon as the vessel 2 is filled, for example filled to the maximum level M, the turbine mode and therewith the generator mode is terminated for example by closing the first shut-off valve 531 and/or the fluid passage through the switching unit 8. The energy storage system 1 is "discharged".

Reference is also made to the European patent application No. 21216018.8 of the same applicant, were various embodiments and configurations for an energy storage system are disclosed.

Figure 2:
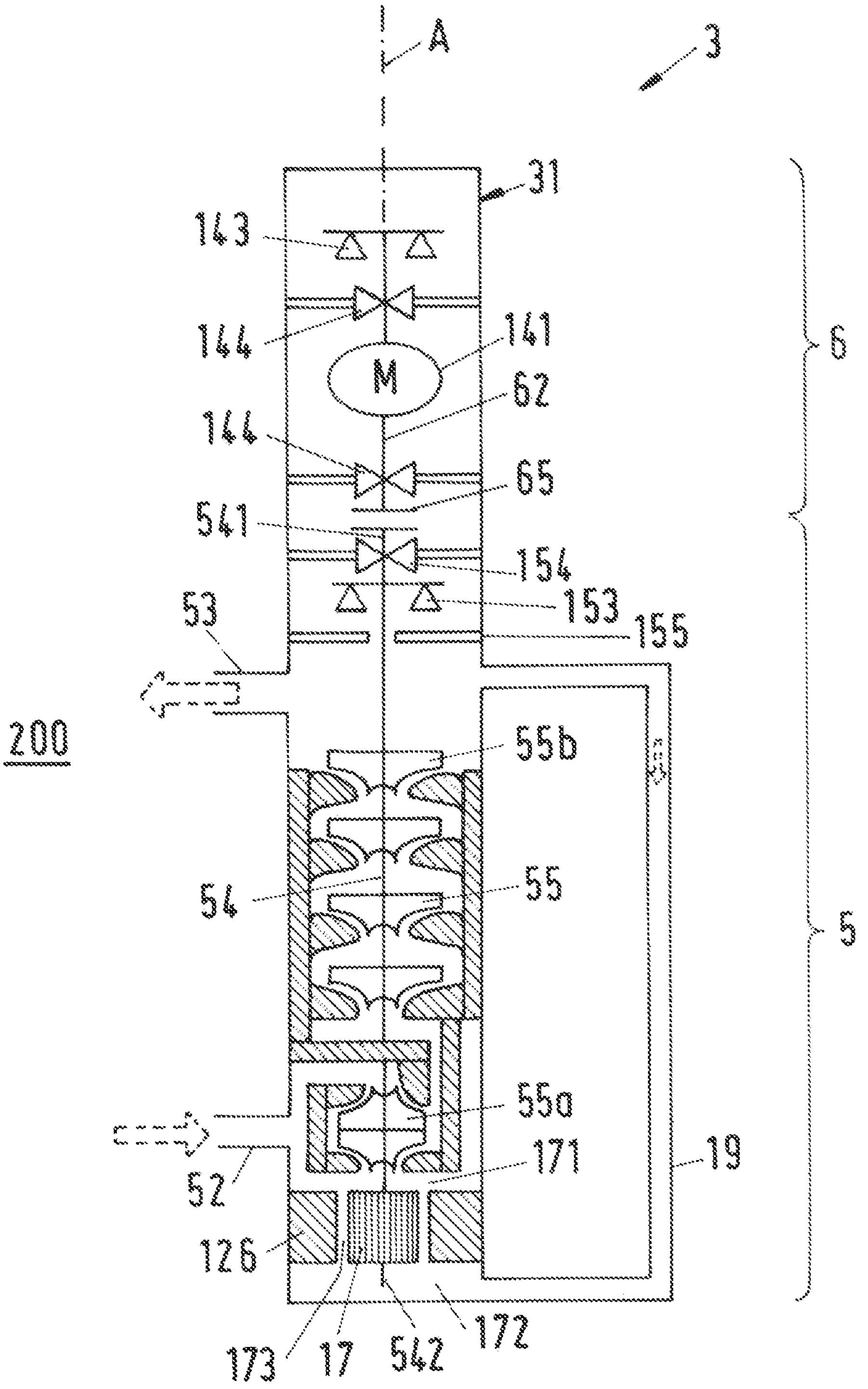
FIG. 2 is a schematic cross-sectional view of an embodiment of the energy conversion device of an energy storage system according to the disclosure.

Referring now to FIG. 2, an embodiment of the energy conversion device 3 of the energy storage device 1 according to the disclosure will be described in more detail. FIG. 2 shows a schematic cross-sectional view of the embodiment of the energy conversion device 3.

It goes without saying that the embodiment shown in FIG. 2 is an example, only. The disclosure is not restricted to this configuration of the pump turbine unit 5 and the motor generator unit 6, respectively.

Basically, each centrifugal pump that can also be operated in a reverse direction, i.e. in a turbine mode, for driving the second shaft 62 of the motor generator unit 6 during operation in the generator mode, is suited as pump turbine unit 5 for the energy conversion device 3. The pump turbine unit 5 has to be configured such that it can withstand the environmental conditions at the underwater location 200. Furthermore, when operating in the pump mode the pump turbine unit 5 has to be strong enough to empty the vessel 2 against the hydrostatic pressure of the water prevailing at the underwater location 200, more particular at the high pressure opening 53.

Preferably, the pump-turbine unit 5 is configured as a multistage pump having a plurality of impellers 55 which are all mounted on the first shaft 54 in a torque proof manner. The pump turbine unit 5 can be configured, for example, in an analogous manner as it is known from water injection pumps at subsea locations in the oil and gas processing industry.

FIG. 2 shows the embodiment of the energy conversion device 3 comprising the motor generator unit 6 and the pump turbine unit 5, both arranged in the housing 31. The pump turbine unit 5 can be configured as a process fluid lubricated pump turbine unit 5. The term "process fluid lubricated pump turbine unit" refers to pumps or pump turbine units, where the process fluid, that is conveyed by the pump 1, here namely water, is used for the lubrication and the cooling of components of the pump turbine unit 5, e.g. the bearings. The process fluid lubricated pump turbine unit 5 does not require a lubricant different from the process fluid for the lubrication of the pump turbine unit components. The process fluid is the sole lubricant used in the pump. Regarding the energy storage device 1 the process fluid is water, for example fresh water, when the underwater location 200 is in a deep lake, or seawater, when the underwater location 200 is a subsea location. The term seawater comprises raw seawater, purified seawater, pretreated seawater, filtered seawater and so on.

In the embodiment shown in FIG. 2 the pump turbine unit 5 is not configured as a process fluid lubricated pump turbine unit 5, but the bearings are lubricated by the barrier fluid supplied to the motor generator unit 6.

The housing 31 surrounds the pump turbine unit 5 and the motor generator unit 6. It is also possible that the housing 31 is configured as a barrel housing 31, in which the pump turbine unit 5 and the motor generator unit 6 are inserted. The housing 31 of the pump turbine unit 5 and the motor generator unit 6 comprises the low pressure opening 52, which is the inlet during pump mode, and the high pressure opening 53, which is the outlet during pump mode. The low pressure i.e. the pressure of the water at the low pressure opening 52 during pump mode is referred to as suction pressure. The high pressure of the water, i.e. the pressure at the high pressure opening 53 during pump mode is referred to as discharge pressure. The discharge pressure is given by the hydrostatic pressure of the water prevailing in the environment of the high pressure opening 53.

The pump turbine unit 5 comprises the first shaft 54 extending from a drive end 541 to a non-drive end 542 of the first shaft 54. The first shaft 54 is configured for rotating about the axial direction A, which is defined by the longitudinal axis of the first shaft 54. The drive end 541 of the first shaft 54 is connected to the coupling 65 that is arranged between the pump turbine unit 5 and the motor generator unit 6.

The motor generator unit 6 comprises the second shaft 62 that is configured for rotating about the axial direction A. The second shaft 62 is connected to the coupling 65. During pump mode the second shaft 62 drives the first shaft 54. During turbine mode the first shaft 54 drives the second shaft 62.

The coupling 65 is configured for transferring a torque between the first shaft 54 and the second shaft 62. Preferably the coupling 65 is configured as a flexible coupling 65, which connects the second shaft 62 to the first shaft 54 in a torque proof manner, but allows for a relative movement between the second shaft 62 and the first shaft 54, e.g. lateral movements. Thus, the coupling 65 transfers the torque but no or nearly no lateral vibrations. The flexible coupling 65 can be configured as a mechanical coupling, a magnetic coupling, a hydrodynamic coupling or any other coupling that is suited to transfer a torque between the second shaft 62 to the first shaft 54.

The pump turbine unit 5 comprises a plurality of impellers 55. The plurality of impellers comprises at least a first stage impeller 55*a* fixedly mounted on the first shaft 54 as well as a last stage impeller 55*b* fixedly mounted on the first shaft 54. The first stage impeller 55*a* is the impeller 55*a* next to the low pressure opening 52 and the last stage impeller 55*b* is the impeller pressurizing the water to the discharge pressure during pump mode. Optionally, the pump turbine unit 5 further comprises one or more intermediate stage impeller(s) 55. Each intermediate stage impeller 55 is arranged between the first stage impeller 55*a* and the last stage impeller 55*b* when viewed in the direction of increasing pressure during pump mode, i.e. the direction of the main fluid flow through the pump turbine unit 5 during pump mode. In the embodiment shown in FIG. 2 three intermediate stage impellers 55 are provided, i.e. the pump turbine unit 5 is configured as an five stage pump. It goes without saying that the number of five stages is only exemplary. The pump turbine unit 5 can be designed also as a multistage pump having more or less than five stages.

The first stage impeller 55*a* is configured as a double suction impeller. All intermediate stage impellers 55 and the last stage impeller 55*b* are configured as single suction impellers 55, Configuring the first stage impeller 55*a* as a double suction impeller has the advantage that the required NPSH (net positive suction head) for the first stage is considerably lower as compared to a single suction design of the first stage impeller. Therewith, the risk of cavitation is strongly reduced. As it is known in the art, a double suction impeller is an impeller having two suction sides. Referring to the representation in FIG. 2, the fluid flows against the first stage impeller 55*a* both from the axially upper side and from the axially lower side of the first stage impeller 55*a*.

The pump turbine unit 5 is designed with an inline arrangement of all impellers 55*a*, 55*b*. In an inline arrangement all impellers are arranged one after another on the first shaft 54 in such a manner that the axial thrust generated by the action of the rotating impellers 55*a*, 55*b* has the same direction for each particular impeller 55*a*, 55, 55*b*. In addition, the main flow of the fluid from the low pressure opening 52 towards the high pressure opening 53 is always directed in the same direction, namely in upward direction according to the representation in FIG. 2.

In other embodiments (not shown) the impellers 55*a*, 55, 55*b* are arranged in a back-to-back arrangement. The pump turbine unit 5 comprises then a first set of impellers 55*a*, 55 and a second set of impellers 55, 55*b* wherein the first set of impellers 55*a*, 55 and the second set of impellers 55, 55*b* are arranged on the first shaft 54 such, that the axial thrust generated by the first set of impellers 55*a*, 55 is directed opposite to the axial thrust generated by the second set of impellers 55, 55*b*.

The back-to-back arrangement has the advantage that the axial thrust acting on the first shaft 54, which is generated by the first set of impellers 55*a*, 55 counteracts the axial thrust, which is generated by the second set of impellers 55, 55*b*. Thus, the two axial thrusts compensate each other at least partially.

As it is shown in FIG. 2 the pump turbine unit 5 is configured as a vertical pump, meaning that during operation the first shaft 54 is extending in the vertical direction, which is the direction of gravity. Thus, the axial direction A coincides with the vertical direction. The motor generator unit 6 is arranged above the pump turbine unit 5. During pump mode the motor generator unit 6, exerts a torque on the drive end 541 of the first shaft 5 for driving the rotation of the first shaft 54 and the impellers 55, 55*a*, 55*b* about the axial direction A.

A direction perpendicular to the axial direction is referred to as radial direction. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. Hereinafter relative terms regarding the location like "above" or "below" or "upper" or "lower" or "top" or "bottom" refer to the usual operating position of the energy conversion device 3. FIG. 2 shows the embodiment of the energy conversion device 3 in its usual operating position.

In other embodiments (not shown) the pump turbine unit 5 can be configured as a horizontal pump, meaning that during operation the first shaft 54 is extending perpendicular to the vertical direction, which is the direction of gravity. Thus, the axial direction A is perpendicular to the vertical direction.

In the embodiment of the energy conversion device 3 shown in FIG. 2 the first shaft 54 of the pump turbine unit 5 is supported by shaft bearings 153, 154. With respect to the axial direction A the first shaft 54 is supported by an axial bearing 153. Preferably the axial bearing 153 is configured as a hydrodynamic bearing, and even more preferred as a tilting pad bearing 153. The axial bearing 153 is arranged near the drive end 541 of the first shaft 54. Furthermore, the pump turbine unit 5 comprises a radial bearing 154 for supporting the first shaft 54 with respect to the radial direction. The radial bearing 154 is arranged near to the drive end 541 of the first shaft 54, more precisely between the axial bearing 153 and the drive end 541 of the first shaft 54. Preferably, the radial bearing 154 is configured as a hydrodynamic bearing, and even more preferred as a radial tilting pad bearing.

A radial bearing is also referred to as a "journal bearing" and an axial bearing, is also referred to as an "thrust bearing".

In the pump turbine unit 5 shown in FIG. 2 the lubrication and the cooling of both the axial bearing 153 and the radial bearing 154 is realized by the barrier fluid that is supplied to the motor generator unit 6. The barrier fluid is supplied from the barrier fluid reservoir 69 (FIG. 1) through the umbilical line 60 to the underwater location 200. The motor generator unit 6 is configured as a liquid filled motor generator unit 6, wherein the motor generator unit 6 is filled with the barrier fluid.

The energy conversion device 3 further comprises a mechanical seal 155 for sealing the pump turbine unit 5 at the first shaft 54. The mechanical seal 155 is a seal for the rotating first shaft 54. As it is known for mechanical seals as such, the mechanical seal 155 comprises a rotor part (not shown) fixed to the first shaft 54 and rotating with the first shaft 54 as well as a stationary stator part (not shown) fixed with respect to the housing 31. During operation the rotor part of the mechanical seal 155 and the stator part of the mechanical seal are sliding along each other—usually with a fluid film between the seal faces—for providing a sealing action to prevent the process fluid (water) from escaping from the pump turbine unit 5 along the first shaft 54. The mechanical seal 155 is arranged with respect to the axial direction A between the last stage impeller **55*b* and the axial bearing 153**.

The mechanical seal 155 has a process side facing the pump turbine unit 5. The process side is in fluid communication with the high pressure opening 53, so that the pressure prevailing at the process side is at least approximately the same as the high pressure prevailing at the high pressure opening. The mechanical seal 155 seals between the part of the housing 31 which is filled with the process fluid (water) and the part of the housing 31 which is filled with the barrier fluid. According to the representation in FIG. 2 the part above the mechanical seal 155 is filled with the barrier fluid and the part below the mechanical seal 155 is filled with the process fluid (water). The barrier fluid pressure is adjusted to a value which is larger than the high pressure prevailing at the process side of the mechanical seal 155. Thus, any leakage through the mechanical seal 155 is always directed towards the process side of the mechanical seal 155. The barrier fluid can leak through the mechanical seal 155 into the pump turbine unit 5, but the water cannot pass through the mechanical seal 155 from the process side to the motor generator unit 6. Any leakage of the barrier fluid through the mechanical seal 155 will be compensated or replaced from the barrier fluid reservoir 69 through the umbilical line 60. The mechanical seal 155 separates the part of the energy conversion device 3, that is filled with the process fluid (water) from the part of the energy conversion device 3, that is filled with the barrier fluid.

The barrier fluid is supplied to the motor generator unit 6 at a pressure which is at least as high as, and preferable a few bars higher than, the high pressure, so that the water cannot pass through the mechanical seal 155 and therewith cannot enter the motor generator unit 6.

Preferably, the barrier fluid pressure is adjusted to a value which is only slightly larger than the high pressure, e.g. approximately 2-5 bar, so that the pressure difference across the mechanical seal 155 is quite small. A small pressure difference over the mechanical seal 155 results in a small leakage of barrier fluid through the mechanical seal 155.

At the process side the mechanical seal 155 is exposed to the high pressure (discharge pressure), which is given by the hydrostatic pressure of the water at the underwater location 200. At least at high water depths the pressure can be considered as constant. This means, that it is easy to keep a stable pressure difference across the mechanical seal 155, which is beneficial for longevity of the mechanical seal 155 and regarding the overall barrier fluid consumption.

The energy conversion device 3 further comprises a balance drum 17 for at least partially balancing the axial thrust that is generated by the impellers **55*a*, 55, 55*b* during operation of the pump turbine unit 5. The balance drum 17 is fixedly connected to the first shaft 54 and arranged adjacent to or at the non-drive end 542 of the first shaft 54. The balance drum 17 defines a front side 171 and a back side 172. The front side 171 is the side or the space facing the first stage impeller 55*a* of the pump turbine unit 5. The front side 171 is in fluid communication with the low pressure opening 52. Thus, at the front side 171 a pressure prevails that is at least approximately the same as the low pressure prevailing at the low pressure opening 52. The back side 172 is located at the other side of the balance drum 17, according to the representation in FIG. 2 below the balance drum 17. The balance drum 17 is surrounded by a stationary part 126, so that a relief passage 173 is formed between the radially outer surface of the balance drum 17 and the stationary part 126. The stationary part 126 is configured to be stationary with respect to the housing 31. The relief passage 173 forms an annular gap between the outer surface of the balance drum 17 (which is also referred to as a throttle bush in a back-to-back configuration) and the stationary part 126 and extends from the front side 171 to the back side 172**.

A balance line 19 is provided and configured for recirculating pressurized water to the back side 172. The balance line 19 extends from the back side 172 to the process side in front of the mechanical seal 155, where a pressure prevails which is at least approximately the same as the high pressure. Thus, by the balance line 19 and neglecting smaller friction losses along the balance line 19 the back side 172 is exposed to a pressure which is essentially the discharge pressure, i.e. the high pressure. A pressure drop exists across the balance drum 19, because the front side 171 is exposed essentially to the low pressure prevailing at the low pressure opening 52, and the back side 172 is exposed to a pressure, that is approximately the same as the high pressure. The pressure drop over the balance drum 17 results in a force that is directed upwardly in the axial direction A (according to the representation in FIG. 2) and therewith counteracts the downwardly directed axial thrust generated by the impellers 55*a*, 55, 55*b* of the pump turbine unit 5.

Providing the balance drum 17 at the non-drive end 542 of the first shaft 54 has the advantage that the balance drum 17 can be additionally used as a hydrostatic support device for providing a radial support to the first shaft 54 at the non-drive end 542. A hydrostatic support device is preferably configured to provide the support by the Lomakin effect. Different from hydrodynamic radial bearings, which require a rotation of the first shaft 54 to generate the radial bearing forces, a hydrostatic support device does not require a rotation of the first shaft 54 for supporting the first shaft 54 with respect to the radial direction, but a pressure drop across the hydrostatic support device with respect to the axial direction A. As it is known in the art, for example, the Lomakin effect requires a pressure drop along an annular gap for the fluid arranged between the first shaft 54 and a stationary part surrounding the first shaft. The conventional hydrodynamic radial bearing does not require a mentionable pressure drop across the radial bearing, but needs the rotation of the first shaft 54.

Since the balance drum 17 provides for a pressure drop along the annular relief passage 173 arranged between the balance drum 17 and the stationary part 126, the balance drum 17 can be used as a hydrostatic support device for radially supporting and centering the first shaft 54 by the Lomakin effect.

Therefore, it is not necessary, to provide a separate radial bearing, such as a hydrodynamic bearing, at the non-drive end 542 of the first shaft.

Furthermore, there is no need for an additional mechanical seal at or near the non-drive end 542 of the first shaft.

The motor generator unit 6 comprises an electric motor 141, the second shaft 62 extending in the axial direction A, and a plurality of second shaft bearings, namely an axial second shaft bearing 143 and two radial second shaft bearings 144. The electric motor 141 comprising the rotor 63 and the stator 64 (see e.g. FIG. 1) can be operated in the generator mode, wherein the second shaft 62 is driven by the first shaft 54 during turbine mode. In the generator mode the rotation of the rotor 63 inside the stator 64 produces electric energy, which is transmitted by the electric power line 66 to the energy unit 67. During the motor mode the electric motor 141 receives electric energy by the electric power line 66 and rotates the second shaft 62 about the axial direction A for driving the first shaft 54 of the pump turbine unit 5 operating in the pump mode.

Referring to the representation in FIG. 2 the axial second shaft bearing 143 and one of the radial second shaft bearings 144 are arranged above the electric motor 141, and the other of the radial second shaft bearings 144 is arranged below the electric motor 141, namely between the electric motor 141 and the coupling 65 with respect to the axial direction A. Preferably, each of the second shaft bearing 143, 144 is configured as a hydrodynamic bearing. The second shaft bearings 143, 144 are lubricated and cooled by the barrier fluid with which the motor generator unit is filled.

The electric motor 141 of the motor generator unit 6 comprises the inwardly disposed rotor 63 (see e.g. FIG. 1), which is connected to the second shaft 62 in a torque proof manner, as well as the outwardly disposed stator 64 surrounding the rotor 63 with an annular gap between the rotor 63 and the stator 64. The rotor 63 can constitute a part of the second shaft 62 or is a separate part, which is rotationally fixedly connected to the second shaft 62, so that the rotation of the rotor 63 drivers the second shaft 62 (motor mode) or vice versa (generator mode). The electric motor 141 can be configured as a cable wound motor. In a cable wound motor the individual wires of the stator 64, which form the coils for generating the electromagnetic field(s), are each insulated, so that the motor stator 64 can be flooded even with an electrically conducting fluid. The cable wound motor does not require a dielectric fluid as barrier fluid for cooling the stator 64. Alternatively, the electric motor 141 can be configured as a canned motor. When the electric drive 141 is configured as a canned motor, the annular gap between the rotor 63 and the stator 64 is radially outwardly delimited by a can that seals the stator 64 hermetically with respect to the rotor 63 and the gap. Thus, any barrier fluid flowing through the gap cannot enter the stator 64. When the electric motor 141 is designed as a canned motor the electric motor 141 is filled with the barrier fluid. Preferably the entire motor generator unit 6 is filled with the barrier fluid.

Preferably, the electric motor 141 is configured as a permanent magnet motor or as an induction motor.

The electric motor 141 can be designed to operate with a variable frequency drive (VFD), in which the speed of the drive, i.e. the frequency of the rotation is adjustable by varying the frequency and/or the voltage supplied to the electric motor 141. Preferably, the VFD is provided in the energy unit 67. However, it is also possible that the electric motor 141 is configured differently, for example as a single speed or single frequency drive.

Optionally, the high pressure opening 53 can be configured to extend from the housing 31 to a location which is a distance away from the housing 31 of the pump turbine unit 5, for example at a certain elevation from the sea ground, in order to avoid the intake of sand or other solid material, in particular during the turbine mode.

The switching unit 8 is particularly advantageous for starting the pump mode, which will be explained now referring to FIG. 3. Without loss of generality it is assumed that the energy storage system 1 is fully "discharged", i.e. the vessel 2 is filled with water up to the maximum level M. The pump turbine unit 5 is at standstill and completely filled with water at the high pressure, i.e. the hydrostatic pressure of the water prevailing at the underwater location 200. The control valve 86 of the switching unit 8 is in the closed position. Since the pump turbine unit 5 is filled with water at the high pressure, the high pressure also prevails at the low pressure opening 52 as well as at the second opening 82 of the switching unit 8.

For starting the pump mode the pump turbine unit 5 is started by supplying electric energy to the motor generator unit 6, so that the second shaft 62 starts to drive the rotation of the first shaft 54 with the impellers 55*a*, 55, 55*b*. According to the disclosure, the pump mode is started with operating the pump turbine unit 5 with a zero flow until the rotational speed of the first shaft 54 is sufficient to generate a positive flow from the low pressure opening 52 to the high pressure opening 53. A positive flow in the pump mode designates a flow that is discharged through the high pressure opening 53 of the pump turbine unit 5. A negative flow or a reverse flow designates a flow which is discharged through the low pressure opening 52.

Figure 3:
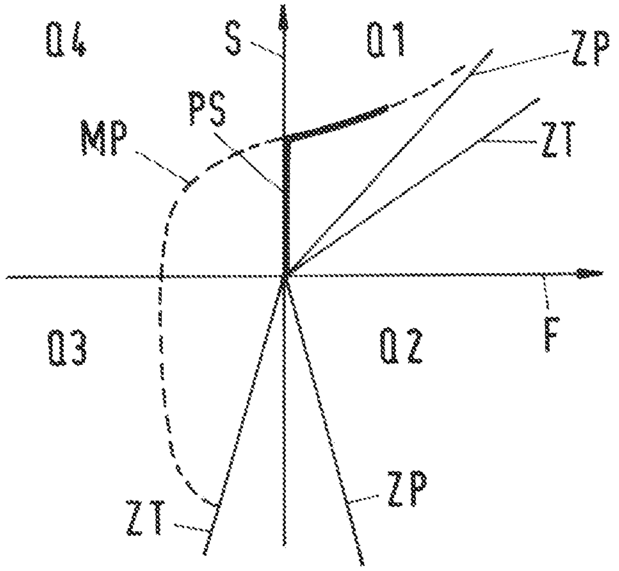
FIG. 3 is a diagram showing the rotational speed versus the flow during the starting of the pump mode.

FIG. 3 is a diagram showing the rotational speed S of the first shaft 54 on the vertical axis versus the flow F discharged through the high pressure opening 53 on the horizontal axis. The intersection of the two axis corresponds to zero flow and zero rotational speed. As already said a positive flow, i.e. on the right side of the vertical axis S, is a flow discharged through the high pressure opening 53 and a negative flow, i.e. on the left side of the vertical axis S, is a flow discharged through the low pressure opening 52. A positive rotational speed S, i.e. above the horizontal axis F, designates a rotation in a first direction, in which the impellers 55*a*, 55, shall convey the water from the low pressure opening 52 to the high pressure opening 53 (pump mode), and a negative rotational speed S, i.e. below the horizontal axis F, designate a rotation in a second direction opposite to the first direction. In the turbine mode the impellers 55, 55*b* shall rotate in the second direction, i.e. with negative rotational speed.

In addition, FIG. 3 shows the dashed curve MP, which indicates a constant pressure difference line. In particular MP shows the constant pressure difference line for a pressure difference generated by the pump turbine unit, which corresponds to 100% of the pressure difference the pump turbine unit 5 shall generate at the duty point. Thus, MP shows the curve on which the pump-turbine unite 5 generates 100% of the duty pressure difference (duty head) In the pump mode the curve MP indicates the operation of the pump turbine unit 5 with the nominal operating rotational speed (duty point speed). Furthermore, FIG. 3 shows the zero torque curve ZT at which the pump turbine unit 5 delivers or generates a torque of zero. The zero pressure rise curve ZP is the curve at which the pressure rise, i.e. the difference between the pressure at the low pressure opening 52 and the high pressure opening 53, equals zero.

The two axis define four quadrants Q1-Q4. The upper right quadrant Q1 is the quadrant, in which the pump mode should take place. More precisely, the region of Q1 in which the pump mode should take place is delimited by the vertical axis S and the zero pressure rise curve ZP The lower left quadrant Q3 is the quadrant where the turbine mode should take place. More precisely, the turbine mode should take place in the region of Q3 which is delimited by the horizontal axis F and the zero torque curve ZT. The upper left quadrant Q4 and most of the lower right quadrant Q2 are regions, where the pump turbine unit 5 operates in energy dissipating modes. For example, in quadrant Q4 the pump turbine unit 5 would operate with a negative flow F and a positive rotational speed S, meaning that the impellers 55*a*, 55, 55*b* rotate in the first direction, where the impellers 55*a*, 55, 55*b* should convey the fluid from the low pressure opening 52 to the high pressure opening 53, but the flow F is directed from the high pressure opening 53 to the low pressure opening 52. This occurs for example when the pump mode shall be started against a reverse (negative) flow F. If one were to start the pump mode, e.g. by simply opening the control valve 86 and starting the rotation of the first shaft 54, the rotation of the impellers 55*a*, 55, 55*b* were started against the negative flow through the pump turbine unit 5. This corresponds to an energy dissipating mode.

To avoid these energy dissipating modes the disclosure proposes to start the pump mode with the zero flow until the rotational speed S of the first shaft 54 is sufficient to generate a positive flow. This is illustrated by the curve PS in FIG. 3 indicating the starting of the pump mode. As it can be seen, when starting from the point of zero rotational speed S and zero flow F, the first shaft 54 is accelerated, i.e. the rotational speed S of the first shaft 54 increases and the flow F remains zero. When the rotational speed S of the first shaft 54 approaches the operating rotational speed, i.e. the duty point speed, the curve PS, still at zero flow, approaches the curve MP. Now, the pump turbine unit 5 is capable to create a pressure difference sufficiently high for causing a positive flow from the low pressure opening 52 to the high pressure opening 53. The end of the curve PS, which is located in the quadrant Q1 and on the dashed curve MP, indicates the duty point, at which the pump-turbine unit 5 operates with the duty point speed, and generates the duty point flow and the duty point pressure head (pressure difference).

Usually, the pump turbine unit 5 will heat-up during operation at zero flow conditions. However, this does not constitute a problem, because known pumps, for example, can be operated at zero flow conditions for at least 30-40 seconds and a typical time to accelerate the first shaft 54 from standstill to a typical rotational speed (duty point speed) of e.g. 1600 rpm is at most 10 seconds.

To keep the pump turbine unit 5 at zero flow until the first shaft 54 has at least approximately reached the duty pint speed, the switching unit 8 is used. As already said, prior to starting the pump mode, the control valve 86 of the switching unit 8 is in the closed position. Since the pump turbine unit 5 is filled with water at the high pressure, the high pressure also prevails at the low pressure opening 52 as well as at the second fluid opening 82 of the switching unit 8. The first fluid opening 81 of the switching unit 8 is exposed to the low pressure generated by the water W in the vessel 2 and in the connection line 4 upstream of the first fluid opening 81. It is obvious that the water cannot pass through neither the first branch 83 nor the second branch 84. The second branch 84 is blocked by the closed control valve 86. Furthermore, the low pressure cannot open the non-return device 85 against the high pressure at the second fluid opening 82. Thus, there is no flow through the switching device 8 and consequently zero flow through the low pressure opening 52.

When the first shaft 54 of the pump turbine unit 5 is accelerated the impellers 55*a*, 55, 55*b* generate an increasing pressure rise, whereby the pressure at the low pressure opening 52 and therewith the pressure at the second fluid opening 82 of the switching unit 8 decreases. When the first shaft 54 approaches its duty point speed the pressure rise generated by the pump turbine unit 5 is as large that the pressure at the low pressure opening 52 and therewith the pressure at the second fluid opening 82 drops below the pressure prevailing at the first fluid opening 81 of the switching unit. Thus, the pressure at the first fluid opening 81 of the switching unit 8 becomes larger than the pressure at the second fluid opening 82 of the switching unit 8. As soon as the pressure difference passes the opening pressure of the non-return device 85 (the opening pressure being very small), the non-return device 85 opens automatically and the water can flow through the first branch 83 to the low pressure opening 82. The positive flow through the pump turbine unit 5 starts and therewith the emptying of the vessel 2. Thus, the flow of water through the non-return device 85 starts nearly instantaneously, when the pressure drop across the non-return device 85 changes its direction or its sign. i.e. when the pressure prevailing at the second fluid opening 82 becomes smaller than the pressure at the first fluid opening 81.

Once the pump turbine unit 5 is at its operating rotational speed (duty point speed) and the non-return device 85 has opened, it is possible to additionally switch the control valve 86 in the open position to reduce the overall flow resistance, which is advantageous in view of the energy efficiency.

Figure 4:
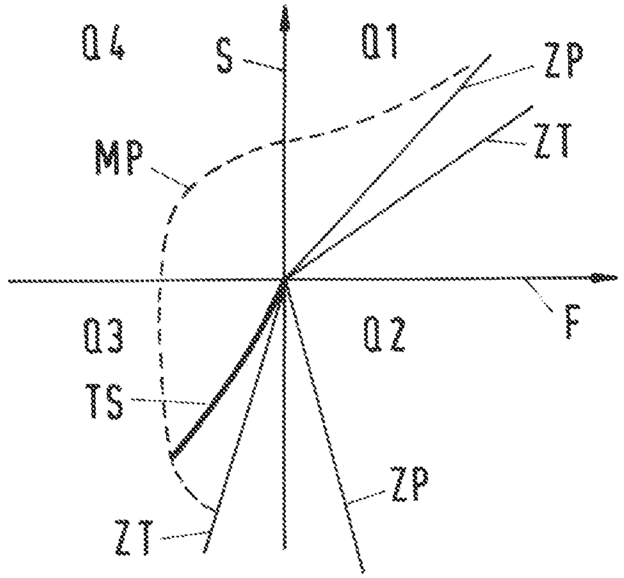
FIG. 4 is a diagram showing the rotational speed versus the flow during the starting of the turbine mode.

FIG. 4 is a diagram showing the rotational speed S of the first shaft 54 on the vertical axis versus the flow F on the horizontal axis in an analogous manner as FIG. 3. However, in FIG. 4 the starting of the turbine mode is illustrated, namely by the curve TS. Without loss of generality it is assumed that the energy storage system 1 is fully "discharged", i.e. the vessel 2 is empty or at a minimum level. The pump turbine unit 5 is at standstill and completely filled with water at the high pressure, i.e. the hydrostatic pressure of the water prevailing at the underwater location 200. The control valve 86 of the switching unit 8 is in the closed position. The first branch 81 of the switching unit 8 is not used for the turbine mode, since the non-return device 85 blocks a flow in the second direction, i.e. towards the vessel 2.

To start the turbine mode, the control valve 86 in the second branch 82 is slowly opened from the closed position to the open position. This renders possible to very smoothly start the turbine mode, in which the water enters the pump turbine unit 5 through the high pressure opening 53, drives the rotation of the first shaft 54 for generating electric energy by the motor generator unit 6 operating in the generator mode, and is discharged through the low pressure opening 52 and the switching unit 8 into the vessel 2. The turbine mode is started slowly by slowly opening the control valve from the closed position to the open position. Thus, the full pressure difference between the high pressure and the low pressure is gradually transferred from across the control valve 86 to across the impellers 55*a*, 55, 55*b* of the pump turbine unit 5.

What is claimed is:

1. An energy storage system configured for installation at an underwater location, comprising:

a vessel configured to store water at a low pressure;

an energy conversion device configured to selectively convert between potential energy and electric energy; and a connection line connecting the vessel with the energy conversion device, the energy conversion device comprising a housing, a pump turbine unit arranged in the housing, and a motor generator unit, the housing comprising a low pressure opening configured to receive water at the low pressure, and a high pressure opening configured to discharge water at a high pressure, the pump turbine unit comprising a first shaft configured to rotate about an axial direction, and at least one impeller mounted on the first shaft configured to interact with the water, the motor generator unit comprising a second shaft configured to rotate about the axial direction, and a rotor disposed at the second shaft and configured to rotate relative to a stator, the second shaft coupled to the first shaft to transmit a torque between the first shaft and the second shaft, and the connection line configured to connect the low pressure opening with an opening disposed at the vessel to receive water from the vessel or discharge water into the vessel, the connection line comprising a switching unit with a shut-off device and a non-return device connected in parallel, and the non-return device configured to enable a flow of the water only in a first direction from the vessel to the low pressure opening.

2. The energy storage system in accordance with claim 1, wherein the low pressure opening is located at a greater depth than the opening.

3. The energy storage system in accordance with claim 1, wherein the shut-off device is a control valve.

4. The energy storage system in accordance claim 1, wherein the energy conversion device is a multistage pump comprising the housing, the pump turbine unit and the motor generator unit are arranged within the housing, the first shaft extends from a drive end to a non-drive end, and the drive end is coupled to the second shaft.

5. The energy storage system in accordance with claim 4, further comprising a mechanical seal configured to seal the pump turbine unit at the first shaft adjacent to the drive end, the mechanical seal having a process side facing the pump turbine unit, the process side being in fluid communication with the high pressure opening, so that a pressure prevailing at the process side is at least approximately the same as the pressure at the high pressure opening.

6. The energy storage system in accordance with claim 4, further comprising a balance drum fixedly connected to the first shaft adjacent to the non-drive end, the balance drum defining a front side facing the pump turbine unit and a back side, a relief passage disposed between the balance drum and a stationary part configured to be stationary with respect to the housing, the relief passage extending from the front side to the back side, and a balance line configured to recirculate pressurized water to the back side.

7. The energy storage system in accordance with claim 6, wherein the front side is in fluid communication with the low pressure opening, so that a pressure prevailing at the front side is at least approximately the same as the pressure at the low pressure opening.

8. The energy storage system in accordance with claim 4, wherein the first shaft is radially supported in a non-contacting manner during operation, the pump turbine unit comprises exactly one hydrodynamic radial bearing to support the first shaft, and the radial bearing is arranged at the drive end of the first shaft.

9. The energy storage system in accordance with claim 5, wherein the mechanical seal arranged adjacent to the drive end is the sole mechanical seal to seal the pump turbine unit at the first shaft.

10. The energy storage system in accordance with claim 1, wherein the pump turbine unit comprises a first stage impeller and a last stage impeller, and the first stage impeller is a double suction impeller.

11. The energy storage system in accordance with claim 4, wherein the multistage pump is a vertical pump with the first shaft extending in a direction of gravity, and the motor generator unit is arranged on top of the pump turbine unit.

12. The energy storage system in accordance with claim 1, wherein the motor generator unit is a liquid filled motor generator unit, and a barrier fluid can be supplied to the motor generator unit at a pressure that is at least as high as a pressure prevailing at the process side of the mechanical seal.

13. A method of operating an energy storage system configured for installation at an underwater location, the method comprising:

providing an energy storage system comprising a vessel to store water at a low pressure, an energy conversion device to selectively convert between potential energy and electric energy, and a connection line connecting the vessel with the energy conversion device, the energy conversion device comprising a housing, a pump turbine unit arranged in the housing, and a motor generator unit, the housing comprising a low pressure opening to receive water at the low pressure, and a high pressure opening to discharge water at a high pressure, the pump turbine unit comprising a first shaft to rotate about an axial direction, the motor generator unit comprising a second shaft to rotate about the axial direction, and the second shaft coupled to the first shaft to transmit a torque between the first shaft and the second shaft, and selectively operating the energy storage system in a pump mode or in a turbine mode, in the pump mode the pump turbine unit operated to discharge the water from the vessel through the high pressure opening, and in the turbine mode the water enters the housing through the high pressure opening, drives the rotation of the first shaft and is discharged through the low pressure opening to the vessel, the pump mode started by operating the pump turbine unit with a zero flow until the rotational speed of the first shaft is sufficient to generate a positive flow from the low pressure opening to the high pressure opening.

14. The method in accordance with claim 13, further comprising using a check valve to end the operating of the pump turbine unit with the zero flow.

15. The method in accordance with claim 13, wherein the turbine mode is started by opening a control valve provided in the connection line.

16. The energy storage system in accordance with claim 1, wherein the pump turbine unit comprises a first stage impeller, a last stage impeller, and at least one intermediate stage impeller, and the first stage impeller is a double suction impeller.

* * * * *